United States Patent [19]

Frieber

[11] 4,451,947
[45] Jun. 5, 1984

[54] ELECTRICAL WIRE HANDLING TOOL

[75] Inventor: George Frieber, Basking Ridge, N.J.

[73] Assignee: A T & T Bell Telephone Laboratories, Murray Hill, N.J.

[21] Appl. No.: 402,202

[22] Filed: Jul. 26, 1982

Related U.S. Application Data

[63] Continuation of Ser. No. 178,032, Aug. 14, 1980, abandoned.

[51] Int. Cl.³ ............................................. H02G 1/00
[52] U.S. Cl. ......................................... 7/107; 7/158
[58] Field of Search .................... 7/107, 132, 134, 158; 254/18, 19, 25, 28; 30/194, 240, 265, 261; 140/124, 122, 119; 29/751, 750, 758, 566.4

[56] References Cited

U.S. PATENT DOCUMENTS

| | | | |
|---|---|---|---|
| 526,480 | 9/1894 | Bernard | 7/134 |
| 751,848 | 2/1904 | Goldsmith | 254/25 |
| 840,580 | 1/1907 | McMillan | 254/25 |
| 4,079,514 | 3/1978 | Arlett | 30/261 |

Primary Examiner—Roscoe V. Parker
Attorney, Agent, or Firm—H. L. Newman

[57] ABSTRACT

An electrical wire handling tool (10) is disclosed. This tool is useful for cutting jumper wires to any required length and at any location, for installing jumper wires into slotted beam connectors, and for removing no longer needed jumper wires from such connectors. The tool is comprised of a handle (20) which has first and second recesses (23,27 and 25,29) in oppositely disposed ends (24,28 and 26,30). In the first handle recess there is affixed means (40) for coupling electrical wires to the connectors. In the second handle recess there is affixed means (60) for removing electrical wires from connectors. The tool further includes a third recess (32) in an intermediate, internal region (31) of the handle which has housed therein means (80) for cutting electrical wires.

7 Claims, 3 Drawing Figures

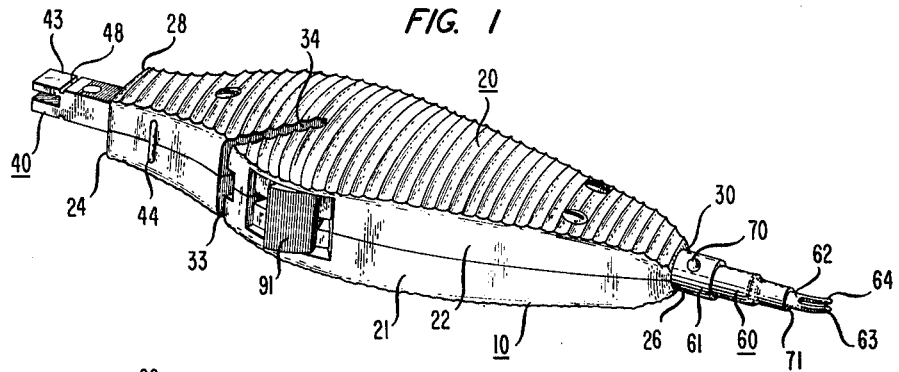
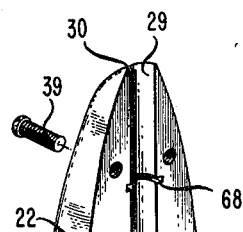
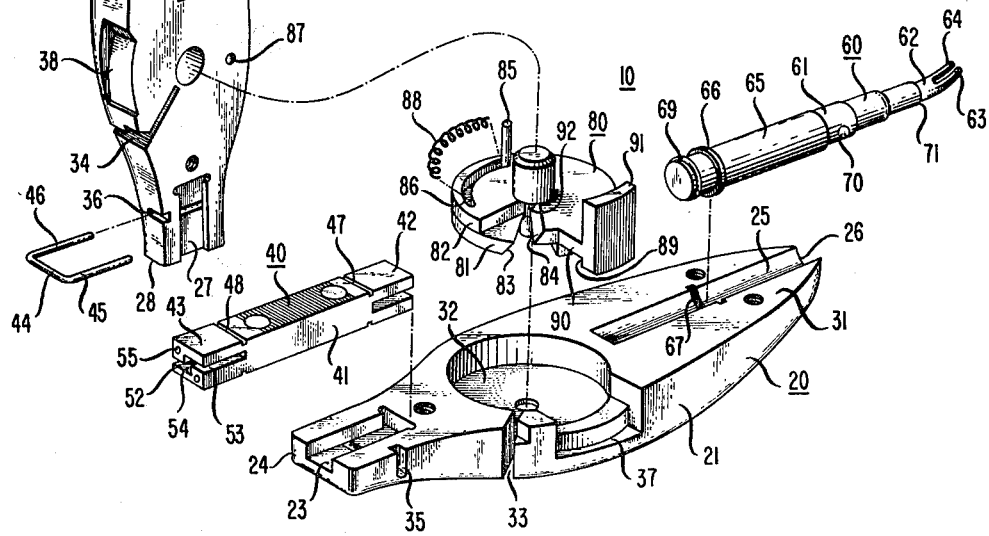
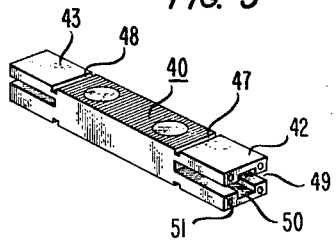

ELECTRICAL WIRE HANDLING TOOL

CROSS-REFERENCE TO RELATED APPLICATION

This application is a continuation of my copending application, Ser. No. 178,032, filed Aug. 14, 1980, and now abandoned.

BACKGROUND OF THE INVENTION

1. Technical Field of the Invention

This invention relates to an electrical connection forming or wire preparation tool and, in particular, to an electrical wire handling tool for cutting wires, inserting wires into insulation piercing connectors and removing wires from such connectors.

2. Description of the Prior Art

With the increasing use of single-sided main distributing frames in telephone central offices, which frames use insulation crushing, abrading or piercing connectors, there has arisen a need for a tool to handle the wiring on such a frame. Such a tool should be capable of cutting jumper wires to the required length, installing jumper wires into the connectors and removing no longer needed jumper wires from the connectors.

One illustration of a tool for inserting electrical wires into clip-type terminals is set forth in U.S. Pat. No. 3,896,534 issued to H. Kaufman et al on July 29, 1975. The Kaufman et al tool uses an automatic impulse generator to apply a controlled impulse to a blade during insertion of the wire. The tool features a blade construction having a removable and reversible tip.

The Kaufman et al tool suffers a number of drawbacks. The first of these drawbacks concerns wire cutting capability. While the Kaufman et al tool does include a cutting capability, its use is limited to cutting wires upon which action has already been performed, that is, cutting wires that have been installed in a connector. The second drawback exhibited by this tool is its lack of wire removal capability.

Another illustration of the state of the art in electrical hand tools is set forth in U.S. Pat. No. 4,064,581 issued to M. Kober on Dec. 27, 1977. Kober discloses a tool which is used to strip insulation from electrical wire, wrap the stripped end about a terminal and unwrap a stripped end to remove the wire from a terminal. The wrapping and unwrapping bits extend from opposite ends of a common handle on which the stripper is mounted.

While Kober teaches a hand tool capable of both making an electrical connection and undoing an already made electrical connection, the tool is only usable for wirewrap-type connections. As such this tool is of no utility for handling wires to be terminated in or removed from insulation crushing, abrading or piercing connectors. Moreover, Kober does not address the problem of cutting wires to any desired length at any location.

Yet another illustration of the state of the art in electrical hand tools appears in U.S. Pat. No. 4,189,800 issued to T. E. Roswell on Feb. 26, 1980. Roswell discloses a self-contained breadboard wiring tool. This tool is used for inserting thin insulated wire into narrow slots of solderless electrical contacts and subsequently cutting the length of wire needed. The cutting tool is a prolongation of a shaft supporting a supply spool of the requisite wire.

Similar to the Kaufman et al tool, the Roswell tool is devoid of any wire extraction apparatus. In addition, the cutting arrangement disclosed by Roswell suffers the same drawback heretofore described with respect to the Kaufman et al tool, that is, the cutting apparatus is limited to cutting wires upon which action has already been performed.

Still another illustration of the state of the art in electrical wire handling tools is set forth in U.S. Pat. No. 4,194,256 issued to R. H. Knickerbocker on Mar. 25, 1980. Knickerbocker discloses a wire installing tool for inserting wire into a multifingered electrical connector. The tool comprises a handle containing a reversible elongated stem having recesses at both ends. The recesses are sized differently in depth to adapt to electrical connectors having various thicknesses. A disposable blade is releasably mounted on the stem and aligned with the recess to form a cavity. The depth of the cavity is dependent upon which end of the stem is aligned with the blade. One end of the blade has a two-sided edge with the outer side being shaped at an optimum shear angle for shearing wire to be inserted into the electrical connector, while the inner side of the blade is shaped to allow for a wire tail to protrude a predetermined distance from the electrical connector. The other end of the blade has a blunt end rather than a cutting edge. The blunt end is used to install wire on an electrical connector without cutting the wire.

Similar to the Kaufman et al tool, the Knickerbocker tool suffers a number of drawbacks. These drawbacks include the inability to cut wire to any desired length and at any location, and the inability to extract a wire once it has been installed.

In view of the foregoing, it is apparent that there continues to exist a need for a tool which is capable of: cutting jumper wires to the required length and at any location; installing jumper wires into insulation crushing, abrading or piercing connectors; and removing no longer needed jumper wires from such connectors.

SUMMARY OF THE INVENTION

The heretofore described problems are overcome and the need satisfied in accordance with my invention of an electrical wire handling tool. This tool is comprised of a handle which has first and second recesses in oppositely disposed ends. In the first handle recess there is affixed means for coupling electrical wires to electrical connectors. In the second handle recess there is affixed means for removing electrical wires from electrical connectors. The tool further includes a third recess in an intermediate, internal region of the handle which has housed therein means for cutting electrical wires.

An additional advantage possessed by my tool is that the electrical wire cutting means is comprised of one fixed circular plate and a similar such plate which is movable. The movable plate is biased with respect to the fixed plate. When a wire is inserted into the cutting means and the latter is actuated, a scissors-like cutting action ensures rendering a clean, sharp, burr-free edge to the severed wire.

Other advantages exhibited by my tool are that the electrical wire removing means is retractible, that it includes an electrically insulative covering to prevent electrical shorts, and that it is rotatable to facilitate proper alignment with a terminal.

Yet another advantage of my tool is that the electrical wire coupling means includes a reversible head one end of which has a channel-like groove to insure proper alignment of the head with the terminal. This reversible head is mounted so as to facilitate a quick change from one end to the other.

BRIEF DESCRIPTION OF THE DRAWINGS

The aforementioned advantages of my invention as well as other advantages will be better understood upon a consideration of the following detailed description and the appended claims taken in conjunction with the attached drawings of an illustrative embodiment in which:

FIG. 1 is a perspective view of a wire handling tool in accordance with the present invention;

FIG. 2 is an exploded perspective view of the tool illustrating the arrangement of its component parts; and FIG. 3 is a perspective view of the wire coupling head.

DETAILED DESCRIPTION

A wire handling tool 10, in accordance with the present invention, is illustrated in FIG. 1. Wire handling tool 10 is comprised of of four major subassemblies, which are most clearly illustrated in FIG. 2. These subassemblies include handle 20, wire coupling head 40, wire removing head 60 and wire cutter 80.

Handle 20 is comprised of first and second mating halves 21 and 22, respectively. Handle half 21 has an open-ended, generally rectangularly-shaped cavity 23 at end 24 and an open-ended, generally semicylindrically-shaped cavity 25 at end 26. Correspondingly, handle half 22 has an open-ended, generally rectangularly-shaped cavity 27 at end 28 and an open-ended, generally semicylindrically-shaped cavity 29 at end 30.

Cavity 23 in handle half 21 and cavity 27 in handle half 22 form a first recess, when handle halves 21 and 22 are placed adjacent one another in mating relationship, for receiving wire coupling head 40. In a similar fashion, cavities 25 and 29 in handle halves 21 and 22, respectively, form a second recess for receiving wire removing head 60.

At an intermediate, internal region 31 of handle half 21 is a third recess 32. Recess 32 is used to house wire cutter 80. Access to wire cutter 80 is gained through slots 33 and 34 in handle halves 21 and 22, respectively.

Once handle halves 21 and 22 are brought together in a mating relationship, they are so held by a plurality of screws 39. In this configuration handle 20 assumes a shape which conforms to an anatomical shape of the grasping portion of a human hand.

Wire coupling head 40, which is shown in FIGS. 2 and 3, is comprised of a generally rectangularly-shaped member 41 which has first and second connector engaging heads 42 and 43, respectively, at oppositely disposed ends. As noted previously, wire coupling head 40 is received into the first recess formed by cavities 23 and 27. It is retained within the first recess by a generally U-shaped clip 44 having arms 45 and 46 which, when clip 44 is inserted into apertures 35 and 36 in handle halves 21 and 22, frictionally engage either of a pair of narrow slots 47 or 48 located near the ends of wire coupling head 40. By virtue of this frictional engagement, wire coupling head 40 is reversibly mountable within the handle first recess. To change wire coupling head 40, a user need only grasp its exposed end, withdraw it, reverse its orientation and reinsert it.

The utility to be derived from this reversibility of wire coupling head 40 stems from the fact that two different connector configurations can be accommodated quite easily and without the need for a separate tool. For the first connector configuration (not shown), that is, one comprising a single contact connector having an alignment or tracking tab thereon, wire engaging head 42 is employed. Wire engaging head 42, shown most clearly in FIG. 3, includes first and second slots 49 and 50, respectively, which are oriented generally perpendicularly with respect to one another. First slot 49 completely traverses the width dimension of wire engaging head 42 whereas second slot 50 only partially traverses an interior region thereof. Slot 50 facilitates proper engagement with the connector regardless of the spatial orientation of the alignment tab with respect to slot 50. Adjacent to slots 49 and 50 are a plurality of wire engaging apertures 51. These apertures are used to position a wire (not shown) for attachment to the connector.

For the second connector configuration (not shown), that is, a two contact connector wherein the two contacts are laterally offset from one another, wire engaging head 43 is employed. Wire engaging head 43, shown most clearly in FIG. 2, includes first, second and third slots 52, 53 and 54, respectively, which are positioned such that first and second slots 52 and 53 are spaced apart from and parallel with one another. Third slot 54 is oriented generally perpendicularly with respect to slots 52 and 53. Slots 52 and 53 extend partially into wire engaging head 43 from opposite sides whereas third slot 54 partially traverses an interior region of wire engaging head 43 so as to couple first slot 52 to second slot 53. This configuration of slots 52, 53 and 54 facilitates engagement of wire engaging head 43 with a two contact connector such that the first contact is engaged by slot 52 whereas the second offset contact is engaged by slot 53 with the offset accommodated by slot 54.

Adjacent to slots 52, 53 and 54 are a pair of wire engaging apertures 55. These apertures, similar to apertures 51, are used to position a wire for attachment to the two contact connector.

Wire removing head 60, which is illustrated most clearly in FIG. 2, is comprised of cylindrical shaft 61 and fork-like member 62. Fork-like member 62 has first and second spaced-apart tines 63 and 64, the spacing between which is such so as to permit engagement of a terminated wire about opposite sides of a connector.

As noted previously, wire removing head 60 is mounted within the second recess formed by cavities 25 and 29 in handle halves 21 and 22, respectively. This mounting arrangement is such so as to permit fork-like member 62 to be both retractable and rotatable. To accomplish these results shaft 61, which extends from the end of fork-like member 62 opposite that bearing tines 63 and 64, has a portion of its length surrounded by hollow cylindrical sleeve 65. Sleeve 65 has raised lip 66 at one end for engaging depressions 67 and 68 in cavities 25 and 29, respectively, thereby securing sleeve 65 and, hence, wire removing head 60 within handle 20.

In order to limit the extent of axial travel of fork-like member 62, shaft 61 has affixed at an and opposite that coupled to fork-like member 62 a retainer ring 69. Also mounted on shaft 61 are first and second diametrically disposed spring-biased balls 70. Balls 70 are positioned on shaft 61 at points near the end coupled to fork-like member 62. Spring-biased balls 70, in cooperation with sleeve 65, hold fork-like member 62 in position when shaft 65 is extended outwardly from the second recess within handle 20. This mounting arrangement for wire removing head 60 insures that it is both rotatable and retractable.

Surrounding fork-like member 62, except for tines 63 and 64, is an electrically insulative covering 71. Insulative covering 71 prevents any electrical contact between wire removing head 60 and any electrical connector adjacent the connector from which a terminated wire is to be removed.

Wires (not shown), which are to be terminated through the use of wire handling tool 10, may be cut advantageously to any desired length by wire cutter 80 contained within handle 20. Wire cutter 80 is comprised of first and second generally circular plates 81 and 82. Plate 81 has a portion of a radial segment removed therefrom and one of the exposed radial edges 83 is inclined at an angle between 15 and 75 degrees with respect to a plane containing plate 81. In the preferred embodiment this angle is approximately 45 degrees.

Similar to plate 81, plate 82 has a portion of a radial segment removed therefrom and one of its exposed radial edges 84 is inclined at a corresponding angle between 15 and 75 degrees with respect to a plane containing plate 82. Again, in the preferred embodiment, this angle is approximately 45 degrees.

Plates 81 and 82 are rotatably coupled to one another by pin 92 such that rotary movement of plate 81 with respect to plate 82 causes edges 83 and 84 to produce a scissors-like cutting action. The extent of the rotary movement of plates 81 and 82 with respect to one another is controlled by pinlike member 85 and arcuate slot 86. Pinlike member 85 has one end affixed to plate 81 at a point near its periphery such that it extends perpendicularly with respect to the plane containing plate 81. An opposite end of pinlike member 85 is affixed in a recess 87 in handle half 22 thereby fixing plate 81 to prevent rotary movement. Although plate 81 is fixed, plate 82 is capable of limited rotary movement by virtue of a loose coupling between pinlike member 85 and arcuate slot 86, the latter of which is juxtaposed the periphery of plate 82.

Positioned within arcuate slot 86 is helical spring 88. Spring 88 biases radial edge 84 in a first position with respect to radial edge 83 whereby edges 83 and 84 are held in a radially separated state. Upon the rotary movement of plate 82 with respect to fixed plate 81 and, hence, the corresponding rotary movement of radial edge 84 with respect to radial edge 83, helical spring 88 is compressed and the scissors-like cutting action is produced.

To facilitate the application of rotary movement to plate 82 whereby a wire may be cut, plate 82 has extending outwardly from a portion of its periphery a handle comprised of a generally T-shaped projection 89. A stem 90 of T-shaped projection 89 lies in a plane containing plate 82. Crossarm 91 of T-shaped projection 89 has a generally arcuate shape and is knurled to facilitate gripping.

Handle halves 21 and 22 are provided with recesses 37 and 38, respectively, for housing T-shaped projection 89. In addition, slots 33 and 34 are included in handle halves 21 and 22 to facilitate the placement of a wire therein to gain access to wire cutter 80.

In all cases it is to be understood that the above-identified embodiment is illustrative of but a small number of many possible specific embodiments which can represent applications of the principles of the invention. Thus, numerous and various other embodiments can be devised readily in accordance with these principles by those skilled in the art without departing from the spirit and scope of the invention.

What is claimed is:

1. An electrical wire handling tool comprising:
a handle having first and second recesses in oppositely disposed ends and a third recess in an intermediate internal region of the handle;
means mounted in the first handle recess for coupling electrical wires to electrical connectors, the coupling means comprising a generally rectangular shaped member having connector engaging heads at oppositely disposed ends, the member being reversibly mountable within the first handle recess, one of the connector engaging heads including first and second slots which are oriented generally perpendicularly with respect to one another, the first slot completely traversing the head and the second slot partially traversing an interior region of the head, the first slot being adapted for engaging a single contact connector and the second slot being adapted for engaging alignment tabs protruding from the single contact connector, the head further including at least one wire engaging aperture on an end face of the head adjacent to the first and second slots for positioning a wire for attachment to the connector;
means affixed in the second handle recess for removing electrical wires from electrical connectors; and
means housed within the third handle recess for cutting completely through electrical wires.

2. An electrical wire handling tool comprising:
a handle having first and second recesses in oppositely disposed ends and a third recess in an intermediate internal region of the handle;
means affixed in the first handle recess for coupling electrical wires to electrical connectors, the coupling means comprising a generally rectangularly shaped member having connector engaging heads at oppositely disposed ends, the member being reversibly mountable within the first handle recess, one of the connector engaging heads including first, second and third slots, the first and second slots being spaced apart from and extending parallel to one another and the third slot being perpendicular to the first and second slots, the first and second slots extending partially into the head from opposite sides thereof and the third slot partially traversing an interior region of the head so as to couple the first slot to the second slot, the first slot being adapted for engaging one contact of a laterally offset two contact connector and the second slot being adapted for engaging a second contact of the connector, the connector engaging head further including at least one wire engaging aperture on an end face of the head adjacent to the first, second and third slots for positioning a wire for attachment to the connector;
means affixed in the second handle recess for removing electrical wires from electrical connectors; and
means housed within the third handle recess for cutting completely through electrical wires.

3. An electrical wire handling tool comprising:
a handle having first and second recesses in oppositely disposed ends and a third recess in an intermediate region;
means mounted in the first handle recess for coupling electrical wires to electrical connectors;

means mounted in the second handle recess for removing electrical wires from electrical connectors, the removing means comprising a fork-like member having first and second spaced apart tines, the spacing between the tines being such as to permit engagement of a terminated wire about opposite sides of a connector and means for mounting the fork-like member in the handle second recess such that the fork-like member is retractable; and means housed within the third handle recess for cutting electrical wires.

4. An electrical wire handling tool comprising:
a handle; and
means housed within the handle for cutting electrical wires, the cutting means including:
a first generally circular plate having a portion of a radial segment removed such that a first exposed radial edge in the first plate is inclined at a predetermined angle with respect to a plane containing the first plate,
a second generally circular plate having a portion of a radial segment removed such that a second exposed radial edge in the second plate is inclined at approximately the same predetermined angle as the first exposed radial edge,
means for rotatably coupling the first plate to the second plate such that rotary movement of the second plate with respect to the first plate and correspondingly edge produces a scissors-like cutting action, and
a pin-like member affixed at one end to the first plate such that the member extends perpendicularly with respect to the plane containing the first plate, the pin-like member being accommodated by an arcuate slot in the second plate, and means positioned within the arcuate slot for biasing the second plate so as to move the second plate so as move the second radial edge away from the first radial edge,
the second plate having a generally T-shaped projection extending outwardly from a portion of the periphery thereof, a stem of the T-shaped projection lying in a plane containing the second plate and a cross arm of the projection having a generally arcuate shape, the projection forming a handle for rotatably moving the second plate with respect to the first plate.

5. An electrical wire handling tool comprising:
a handle having first and second recesses in oppositely disposed ends and a third recess in an intermediate region;
means affixed in the first handle recess for coupling electrical wires to electrical connectors;
means affixed in the second handle recess for removing electrical wires from electrical connectors; and
means housed within the third handle recess for cutting electrical wires, the cutting means including:
a first generally circular plate having a portion of a radial segment removed such that a first exposed radial edge in the first plate is inclined at a predetermined angle with respect to a plane containing the first plate,
a second generally circular plate having a portion of a radial segment removed such that a second exposed radial edge in the second plate is inclined at approximately the same predetermined angle as the first exposed radial plate, and
means for rotatably coupling the first plate to the second plate such that rotary movement of the second plate with respect to the first plate and correspondingly the second radial edge with respect to the first radial edge produces a scissors-like cutting action.

6. An electrical wire handling tool in accordance with claim 5 further including means affixed to the second plate for facilitating the application of rotary motion to the second plate.

7. An electrical wire handling tool in accordance with claims 4 or 5 further including means for biasing the second plate with respect to the first plate such that when the biasing means is in a first state the first and second radial edges are radially spaced apart from one another in a nonoverlapping position and when the biasing means is in a second state, the first and second radial edges are radially spaced apart from one another in an overlapping position.

* * * * *